(12) United States Patent
Pohle et al.

(10) Patent No.: US 7,139,067 B2
(45) Date of Patent: Nov. 21, 2006

(54) THREE-DIMENSIONAL IMAGING WITH MULTIFRAME BLIND DECONVOLUTION

(75) Inventors: Richard Henry Pohle, Kula, HI (US); Michael Forrest Reiley, Wailea, HI (US)

(73) Assignee: Textron Systems Corporation, Wilmington, MA (US)

( * ) Notice: Subject to any disclaimer, the term of this patent is extended or adjusted under 35 U.S.C. 154(b) by 212 days.

(21) Appl. No.: 10/661,138

(22) Filed: Sep. 12, 2003

(65) Prior Publication Data

US 2005/0057744 A1    Mar. 17, 2005

(51) Int. Cl.
G01C 3/08    (2006.01)

(52) U.S. Cl. .................. 356/5.04; 356/3.01; 356/4.01; 356/5.01

(58) Field of Classification Search ............... 356/5.04
See application file for complete search history.

(56) References Cited

U.S. PATENT DOCUMENTS

| | | | | |
|---|---|---|---|---|
| 5,164,578 A | * | 11/1992 | Witthoft et al. | 250/201.9 |
| 5,231,281 A | * | 7/1993 | DuBruco | 250/208.1 |
| 5,446,529 A | | 8/1995 | Stettner et al. | |
| 5,455,806 A | * | 10/1995 | Hutson | 367/100 |
| 5,550,935 A | | 8/1996 | Erdem et al. | |
| 5,561,611 A | | 10/1996 | Avinash | |
| 5,602,934 A | * | 2/1997 | Li et al. | 382/128 |
| 5,659,413 A | * | 8/1997 | Carlson | 398/122 |
| 5,784,492 A | * | 7/1998 | Cohen et al. | 382/232 |
| H001783 H | * | 2/1999 | McLean | 356/5.04 |
| 6,028,300 A | * | 2/2000 | Rhoads et al. | 250/208.1 |
| 6,130,641 A | * | 10/2000 | Kraeutner et al. | 342/179 |
| 6,133,989 A | | 10/2000 | Stettner et al. | |
| 6,166,853 A | * | 12/2000 | Sapia et al. | 359/559 |
| 6,229,649 B1 | | 5/2001 | Woods et al. | |
| 6,288,974 B1 | * | 9/2001 | Nelson | 367/135 |
| 6,309,352 B1 | * | 10/2001 | Oraevsky et al. | 600/407 |

(Continued)

FOREIGN PATENT DOCUMENTS

WO    WO 02/071607    9/2002

OTHER PUBLICATIONS

Matson, et al., "Multi-frame blind deconvolution and bispectrum processing of atmospherically—degraded data: a comparison," Proceedings of SPIE, vol. 4792, Presented Jul. 8, 2002.

Schulze, et al., "Non-Linear Imaging Algorithm Study," Application Brief's 2002, Maui High Performance Company Center, p. 24-25, Kihei, Hawaii (2002).

Jefferies, et al., "Blind Deconvolution With The Use Of A Phase Constraint," AMOS 2002, AMOS Technical Conference, Kihei, Hawaii, (Sep. 2002).

(Continued)

Primary Examiner—Thomas H. Tarcza
Assistant Examiner—Luke Ratcliffe
(74) Attorney, Agent, or Firm—BainwoodHuang

(57) ABSTRACT

Methods and systems for three-dimensional imaging through turbulence such as produced by the Earth's atmosphere are described. A first light source may direct an output of pulses to a target through atmospheric turbulence. A first image sensor, for example a time of arrival sensor or focal plane, may receive light from the first light source and may be used to record two-dimensional images or image slices of the target. A second light source may also be used. A second image sensor may receive light reflected from the target. An atmospheric point spread function may be derived or calculated by a means for multiframe blind deconvolution from one or more images of the target received at the second image sensor. The point spread function may be used to deblur or improve the resolution of each of the two-dimensional image slices from the first image sensor. The two-dimensional image slices may be combined to form a three-dimensional image of the target.

30 Claims, 5 Drawing Sheets

U.S. PATENT DOCUMENTS

| | | |
|---|---|---|
| 6,323,942 B1 | 11/2001 | Bamji |
| 6,359,681 B1 * | 3/2002 | Housand et al. ............ 356/4.01 |
| 6,414,746 B1 | 7/2002 | Stettner et al. |
| 6,429,415 B1 | 8/2002 | Rhoads |
| 6,445,814 B1 * | 9/2002 | Iijima et al. ................. 382/255 |
| 6,470,097 B1 | 10/2002 | Lai et al. |
| 6,522,395 B1 | 2/2003 | Bamji et al. |
| 6,522,396 B1 | 2/2003 | Halmos |
| 6,580,496 B1 * | 6/2003 | Bamji et al. ................. 356/5.1 |
| 2001/0050764 A1 * | 12/2001 | Shirai ......................... 356/5.1 |
| 2002/0114531 A1 * | 8/2002 | Torunoglu ................... 382/255 |
| 2002/0118352 A1 | 8/2002 | Ohzu et al. |
| 2002/0156821 A1 | 10/2002 | Caron |
| 2002/0196170 A1 | 12/2002 | Mc Ilrath |
| 2003/0223053 A1 * | 12/2003 | Liu et al. ...................... 356/5.1 |

OTHER PUBLICATIONS

Billings, et al., "Mitigating turbulence-induced image blur using multiframe blind deconvolution," AMOS 2001, AMOS Technical Conference, Kihei, Hawaii, (Sep. 2001).

Mats G. Lofdahl, "Multi-frame blind deconvolution with linear equality constraints," Image Reconstruction from Incomplete Data II, Bones, Fiddy & Millane, eds. (Seattle, Washington), p. 1-10, (Jul. 8, 2002).

Schulz, et al., "Multiframe blind deconvolution with real data: imagery of the Hubble Space Telescope," Optical Society of America, Optics Express, vol. 1 (No. 11), p. 355-362, (Nov. 24, 1997).

* cited by examiner

THREE-DIMENSIONAL IMAGING WITH MULTIFRAME BLIND DECONVOLUTION

BACKGROUND

Atmospheric blurring is a major limitation to forming images of high-altitude and space objects using ground-based telescopes. This limitation may be quantified by the seeing coherence length, also known as Fried's seeing parameter, $r_o$, which provides a measure of the largest spatial frequency that is present in a long-exposure image formed by a telescope of interest. For many telescopes and atmospheric imaging systems, the seeing parameter $r_o$ typically has values under 10 cm.

Diffraction-limited telescopes may record spatial frequencies as the ratio of $D/\lambda d_o$, where D is the telescope diameter, $\lambda$ is the nominal wavelength being sensed, and $d_o$ is the distance from the telescope to the observed object. In many situations, however, long exposure imagery acquired through atmospheric turbulence may only contain frequencies up to the turbulence-limited cut-off frequency $r_o/\lambda d_o$.

While exposure times on the order of a few milliseconds or less may provide images with spatial frequency information out to the diffraction limit, blur effects from atmospheric turbulence can degrade such images and diminish resolution capability.

What are needed therefore are systems and methods for three-dimensional imaging of objects through atmospheric turbulence with high resolution capability.

SUMMARY

Embodiments of the present invention are directed to three-dimensional imaging of objects or targets through atmospheric turbulence with high resolution capability.

A first embodiment may include a system for three-dimensional imaging including a first light source producing a first output including two or more pulses. Means may be included for directing the first output to a target. Receiving means may also be included and may be operable to receive a portion of the first output reflected from the target through atmospheric turbulence. A first image sensor may be included that produces or records two or more two-dimensional image slices of the target. A second image sensor may detect or record one or more second sensor images of the target from the light from of the first light source. Means for multiframe blind deconvolution may be included and may be operable to determine a point spread function from a second sensor image. Means for deconvolution operable to deconvolve the point spread function from the two or more two-dimensional image slices may be used to produce a two or more deblurred two-dimensional image slices. Means for combining the deblurred two-dimensional image slices may be included and used to form a three-dimensional image of the target. A second light source may also be used.

The means for multiframe blind deconvolution may include a computer readable medium having instructions to perform the step of estimating a point spread function from a second sensor image. The means for deconvolution may include a computer readable medium having instructions to perform the step of deconvolving a point spread function from the two or more two-dimensional image slices to produce two or more deblurred two-dimensional image slices. The means for combining may include a computer readable medium having instructions to perform the steps of combining deblurred two-dimensional image slices and forming a three-dimensional image of the target. The means for directing may include a laser beam director. The first light source may include a laser having an active medium made of Cr:LiSAF or Nd:YAG. The two or more pulses of the first output may have a fluence of about 0.1 to about 100 Joules per pulse. Each of the two or more pulses may have a pulse width of less than five (5) nanoseconds.

A second embodiment may include a method for creating a three-dimensional image of a target through atmospheric turbulence. A first output of pulses from a laser may be directed to a target. Pulses of the first output that are reflected from the target may pass through atmospheric turbulence and be received. Two or more two-dimensional image slices may be formed at a first image sensor. One or more second sensor images of the target may be formed at a second image sensor. Multiframe blind deconvolution may be performed on the one or more second sensor images. A point spread function may be determined from the one or more second sensor images. The point spread function may be used to deconvolve each of the two or more two-dimensional image slices. Deblurred two-dimensional image slices may be formed from the two dimensional image slices. The deblurred two-dimensional image slices may be combined to form a three-dimensional image of the target.

The two or more two-dimensional image slices may be stored and the step of storing the two or more two-dimensional image slices may include storing the two-dimensional image slices in a first image sensor. Sunlight may be received that is reflected from the target through the atmospheric turbulence. A second output of pulses from a second laser may be directed to the target. The step of performing multiframe blind deconvolution further include incorporating a priori knowledge of the point spread function or the target. The said step of incorporating a priori knowledge may include incorporating positivity constraints. A maximum likelihood of a noise function may be calculated and one or more gradients of a noiseless image of the target may be calculated.

A third embodiment may include a method of forming a three-dimensional image of an object including determining a point spread function from an image of the object from an incoherent source and deconvolving two or more two-dimensional image slices of the object formed from coherent light using the point spread function, forming deblurred image slices. The deblurred image slices may be combined to form a three-dimensional image of the object.

A fourth embodiment may include a three-dimensional imaging system including a point spread function calculated from an image formed from an incoherent light source. A three-dimensional image may include two or more two-dimensional image slices formed from a coherent light source. The two or more two-dimensional image slices may be deblurred by the point spread function.

The three-dimensional imaging system may include processing means operable to calculate the point spread function. The processing means may include means for multiframe blind deconvolution operable to determine the point spread function. The processing means may include means for deconvolution operable to deconvolve said two-dimensional image slices using the point spread function. The processing means may include means for combining said two-dimensional image slices. The three-dimensional imaging system may include an incoherent light source, a coherent light source, or both. The three-dimensional imaging system may include a first image sensor operable to produce two or more two-dimensional image slices. The first image sensor may be a time of arrival image sensor operable to produce two-dimensional image slices. The three-dimensional imaging system may also include a second image sensor.

BRIEF DESCRIPTION OF THE DRAWINGS

These and other features, aspects, and advantages of the present invention will become better understood with regard to the following description, appended claims, and accompanying drawings. The drawings are not necessarily to scale, emphasis instead being placed upon illustrating the principles of the present invention. The drawings include the following:

DETAILED DESCRIPTION

Embodiments of the present invention are directed to systems and methods for three-dimensional imaging of one or more objects or targets through atmospheric turbulence. The effects of atmospheric turbulence, which can otherwise limit the seeing parameter $r_o$ of a telescope or imaging system, may be mitigated and a high-resolution or super-resolved three-dimensional image of an object or target may be produced. As used herein, the terms "target" and "object" may be used interchangeably when allowed by context.

Figure 1:
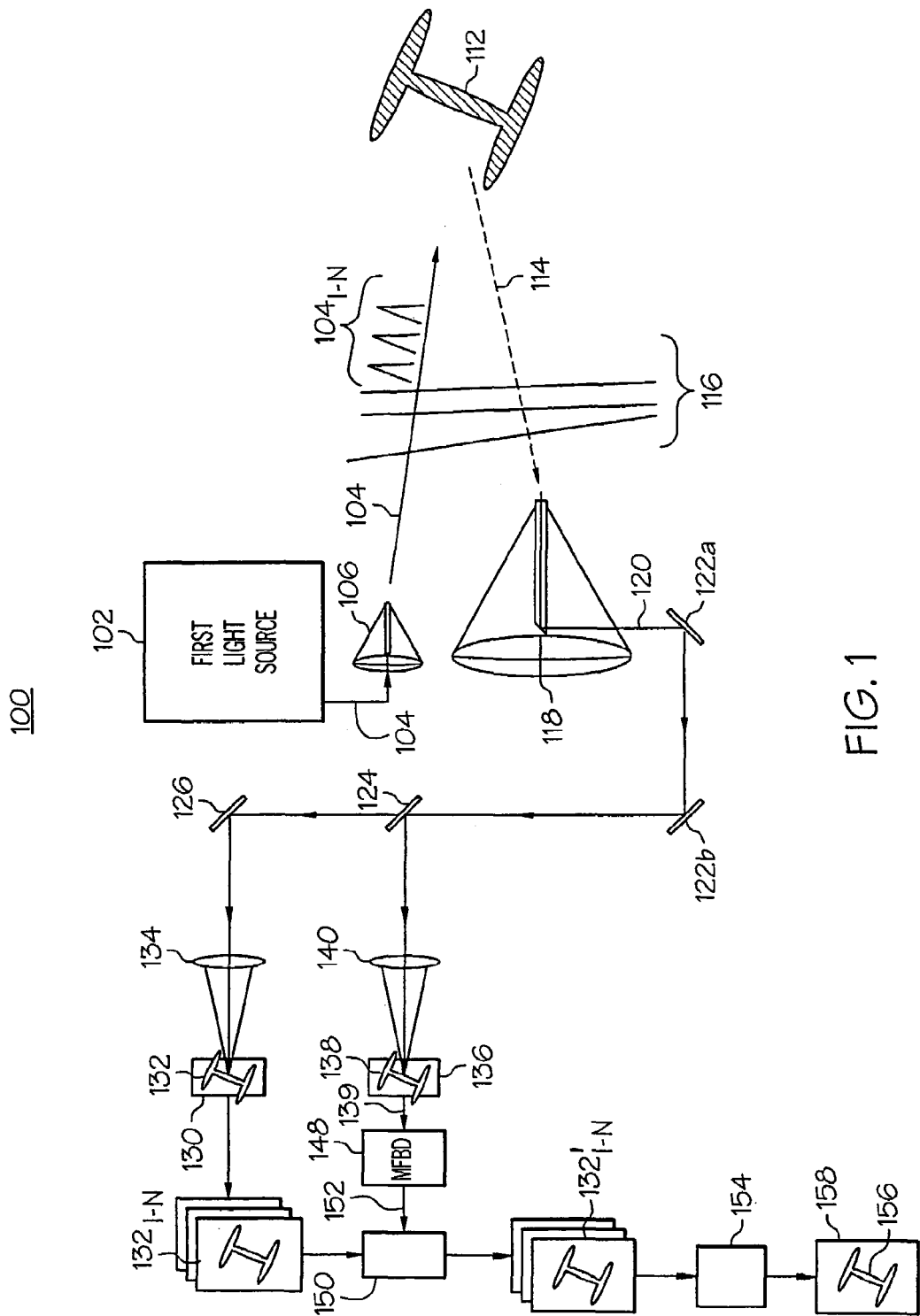
FIG. 1 is a conceptual diagram of a three-dimensional imaging system.

FIG. 1 shows a conceptual diagram of one embodiment of a three-dimensional imaging system 100 in which a point spread function or a transfer function is derived from one image sensor and is used for the deconvolution of a series of two-dimensional images formed from a separate image sensor. A first light source may produce a first output 104 that is directed by means for directing 106 to a target 112. The target 112 may be at high-altitude, in orbit about the Earth, or may be a space object. Pulses of the first output 104 may be swept across the target 112 and as a result different pulses in the output 104 may be reflected from different portions of the target 112. The first output 104 may include a train or sequence of pulses $104_{1-N}$, which may be relatively short-duration pulses. For example, in certain embodiments the first light source 102 may produce an output 104 of pulses $104_{1-N}$ with a two-nanosecond (2 ns) pulse width.

Receiving means 118 may receive reflected light 114 that has been reflected from the target 112 and traveled through atmospheric turbulence 116. The reflected light 114 may include a portion of the first output 104 from the first light source 102, which may be a laser. In certain embodiments, e.g., those used to track a dark object in the Earth's shadow, a quasi-coherent or temporally incoherent laser may be used as the first light source 102. The receiving means 118 may produce a collected light output 120 that may include various wavelengths of the first output 104.

A first portion of the collected light output 120 including photons of the first output 104 may be directed to a first image sensor 130, which may be a "fast" focal plane array or time of arrival sensor. Focusing optics 134 may focus the first portion on the first image sensor 130 to form an image 132 of the target 112. The first image sensor 130 may have the capability of detecting and storing successive two-dimensional images, or image slices $132_{1-N}$, from the light received from the first light source after reflection from the target 112. The first image sensor 130 may include a focal plane array (FPA), which may be of arbitrary size, and may include an array of pixels of semiconductor photodetectors. The photodetectors may include, but are not limited to, suitable photodiodes including avalanche photodiodes. The term "image slices" may refer to stored two-dimensional image, including signals representing such two-dimensional images.

The first image sensor 130 may have a clock cycle that is of the same order as or faster than the pulse width of the pulses of the first output 104. Each of the pixels of the first image sensor 130 may include or be connected to a single corresponding laser radar processing-electronics cell or circuit (not shown) to amplify and/or store amplitudes and ranges associated with pulses of the reflected light 114. Suitable laser radar processing circuitry may include storage and switching electronics or circuitry, for example as described in U.S. Pat. No. 5,446,529 and/or U.S. Pat. No. 6,414,746, the contents of both of which are incorporated herein by reference. The first image sensor 130 may store successive image slices $132_{1-N}$ of the target 112 in internal bins or buffer circuitry. In certain embodiments, two or more image slices $132_{1-N}$ may be read out from the first image sensor 130 between received pulses of the first output 104.

The first image sensor 130 may be operable to detect the photon intensity and time of arrival of pulses of the first output 104 that have been reflected from the target 112 and received at the various pixels or detectors of the sensor 130. In certain embodiments, the first image sensor 130 may include a sensor or hybrid sensor as disclosed in U.S. Pat. No. 6,414,746. Various filters or filter wheels (not shown) may be used to detect desired energy bands of the first portion of the collected light output 120 that are within the detectivity range of the first image sensor 130.

A second portion of the collected light output 120 may be used to determine a point spread function of the system 100. For example, a second portion of the collected light output 120 may be directed by suitable apparatus, such as a dichroic or beam splitter 124, to a second focal plane array or image sensor 136. Focusing optics 140 may focus the second portion on the second image sensor 136 forming a second sensor image 138 of the target 112.

With continued reference to FIG. 1, means for multiframe blind deconvolution (MFBD) 148 may process one or more second sensor images 138 to produce a point spread (PSF) output 152 that includes an estimate or calculation of an atmospheric point spread function for the system 100. The means for multiframe blind deconvolution 148 may include suitable multiframe blind deconvolution algorithms. The point spread function 152 may then be processed by means for deconvolution 150 to deconvolve or deblur each of the image slices $132_{1-N}$ produced by the first image sensor 130 thereby forming deblurred image slices $132'_{1-N}$. The means for deconvolution 150 may include suitable deconvolution algorithms and may be implemented in various hardware and/or software.

Means for combining 154 may be used to combine the deblurred image slices $132'_{1-N}$ to form a three-dimensional image 156 of the target 112. Because the point spread function 152 produced by the means for MFBD 148 is determined for incoherent or quasi-coherent light, the effects of speckle are minimized when the three-dimensional image 156 is produced. The three-dimensional image 156 may be displayed on display means 158 such as a cathode ray tube (CRT), flat panel display, liquid crystal display (LCD), or the like. Data associated with the three-dimensional image 156 may be utilized for various purposes including, but not limited to, observing, targeting and tracking the target 112.

The means for combining 154 may include suitable combination algorithms. The means for multiframe blind deconvolution 148, the means for deconvolution 150, and the means for combining 154 may include or be included within common or shared algorithms, software and/or hardware. For example parallel processor means or configurations may implement the means for multiframe blind deconvolution 148, the means for deconvolution 150 and/or the means for combining 154. Suitable processing means may by way of non-limiting example include parallel processing systems including 32-bit and/or 64-bit UNIX servers in 16-way and 32-way configurations and also large Linux clusters. In certain embodiments, processing means such as those at the Maui High Performance Computing Center Air Force Research Laboratory may be used.

The first light source 102 may be any suitable pulsed laser. In certain embodiments, a suitable pulsed laser may be used that produces pulses with fluence values of 0.1 to 100 Joules per pulse. In certain embodiments, the first light source 102 may have an active medium that produces an output in the near infrared band, for example at 830 nanometers or at 1.06 microns. Suitable active media for the first light source 102 may include, but are not limited to, chromium-doped lithium strontium aluminum fluoride (Cr:LiSAF) and neodymium-doped yttrium aluminum garnet (Nd:YAG).

The pulse characteristics of output 104 may be actively controlled by known timing and/or pulse-compression techniques and devices (not shown) or means for pulse compression. Suitable pulse-compression devices, may include, but are not limited to, grating-pair compressors, prism-pair compressors, and chirped dielectric mirrors. In certain embodiments, the first light source 102 may be mode locked, actively or passively, to facilitate a short pulse width, e.g., to produce pulses with a pulse width less than or equal to five nanoseconds. In certain embodiments, pulses widths may be between about 0.1 to about 2 nanoseconds. As shorter and shorter pulse widths are obtained by new pulse compression techniques and apparatus, one of skill in the art should understand that the means for compression of the present invention will have greater utility and scope.

Mirrors within the means for directing 106 may be movable so that the output 104 can be directed to any region of the observable sky. For example, various mirrors of the means for directing 106 may be mounted on gimbaled mirror mounts and the means for directing 106 may include an azimuth table. In certain embodiments, the means for directing 106 may be a laser beam director with multiple mirrors or lenses, e.g., one with primary, secondary, and tertiary mirrors. In certain embodiments, the means for directing 106 may have a 60-cm diameter aperture or primary mirror. One example of a means for directing, a laser beam director, is described below for FIG. 3.

In certain embodiments, the receiving means 118 may include a collector or telescope and may include one or more mirrors or lenses. For example, the receiving means 118 may include a telescope with primary, secondary and tertiary mirrors. In certain embodiments the receiving means 118 may include a relatively large-aperture telescope, for example, a telescope with a 3.67 m primary mirror such as the Advanced Electro-Optical System (AEOS) at the Maui Space Surveillance Center of the U.S. Air Force.

Figure 2:
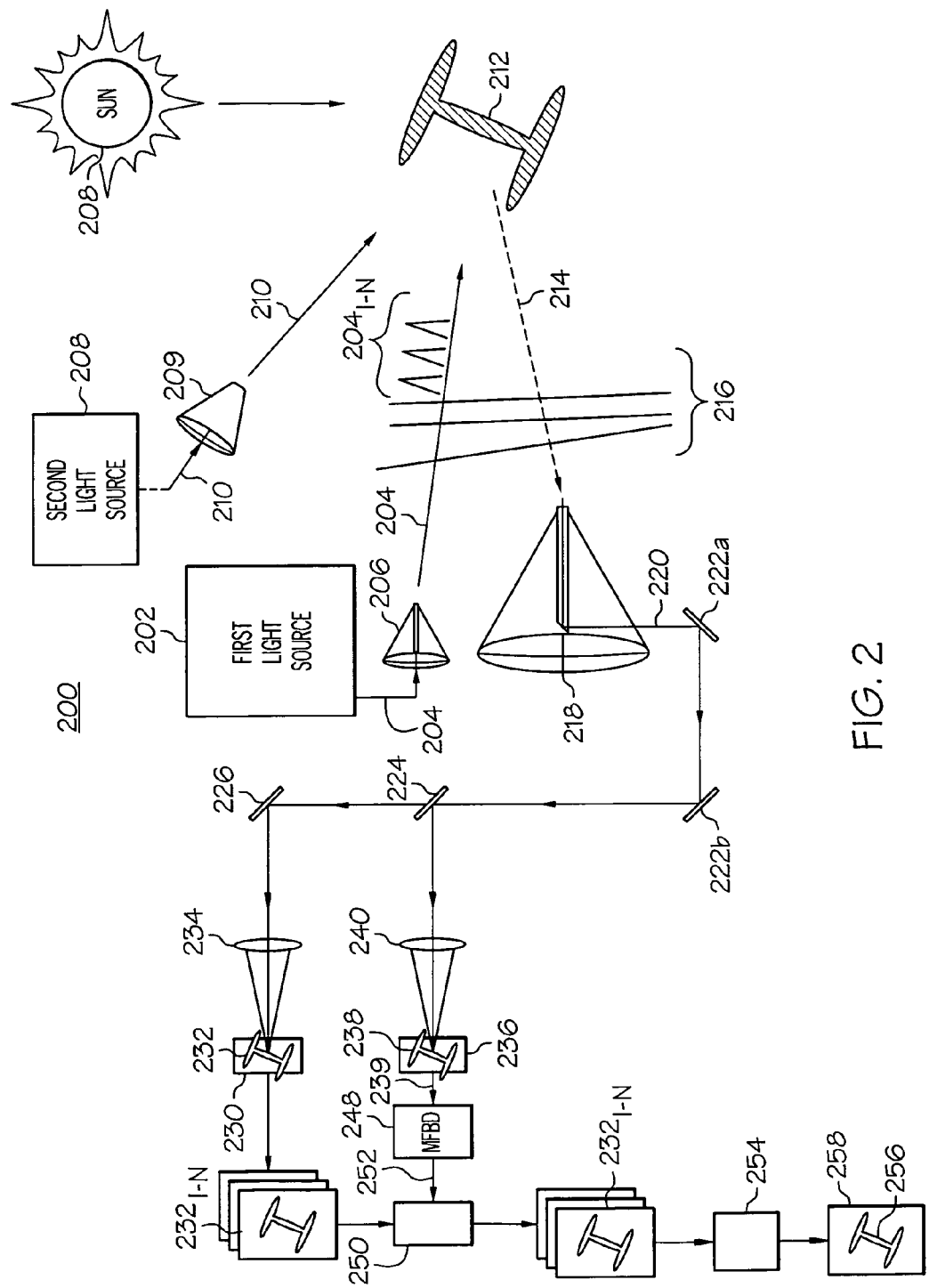
FIG. 2 is a conceptual drawing of a three-dimensional imaging system using multiple light sources.

Referring now to FIG. 2, a second embodiment of a three-dimensional imaging system 200 is shown that includes a second light source. A first light source 202 produces a first output 204 of pulsed laser light $204_{1-N}$. The first output 204 is directed by a laser beam director 206 to a target 212. Receiving means 218 collect or receive some of the first output 204 that has been reflected from the target and traveled through atmospheric turbulence 216.

A second light source 208 may be utilized to produce an image of the target to derive a point spread function for the system 200. Examples of a second light source 208 may include, but are not limited to, a laser, multiple lasers, the sun, and/or self-emission from the target. When one or more lasers are used as the second light source, a second output 210 from the laser(s) may be directed to the target by the first laser beam director 206 or a second, separate laser beam director 209. The second output 210 may include one or more pulses and may be used to illuminate the target 212 with a light of a different spectral range or bandwidth than the first output 204. This system 200 may be advantageous to produce a three-dimensional image of a "dark" target, i.e., one that is in the Earth's shadow.

Continuing with the description of FIG. 2, a first image sensor 230, e.g., a time of arrival sensor or "fast" focal plane array, may receive a collected light output 220 from the receiving means 218. Directing mirrors 222a, 222b may direct the collected light output 220. The collected light output 220 may include light from the first light source 202 and the second light source(s) 208 that has been reflected from the target 212. The first image sensor 230 may record two-dimensional images or image slices $232_{1-N}$ of the target 212.

A second portion of the collected light output 220 may be directed to a second image sensor 236, for example by a beam splitter 224. A focusing lens 240 may focus the second portion on the second image sensor 236 forming a second sensor image 238 of the target 212. The second image sensor 236 may produce a signal 239 corresponding to the second sensor image 238 and this corresponding signal 239 may be processed by a means for multiframe blind deconvolution 240. Based on the laser returns or pulses from the second light source 208 that have been reflected from the target 212 and focused at the second image sensor 236, the means for multiframe blind deconvolution 240 may calculate and produce as an output an atmospheric point spread function 252 of the systems 200.

The second image sensor 236 may be configured or made of materials to detect different wavelengths than the first image sensor 230. For example, the first image sensor 230 may have detector materials to detect light in the near infrared (NIR) or medium-wave infrared (MWIR) ranges while the second image sensor 230 may be made from detector material(s) sensitive to visible light. For example, in certain embodiments, the second image sensor 236 may have peak detectivity near 700 nm. Semiconductor detector materials for the first and second image sensors 230, 236 may be selected based on bandgap energies and corresponding detection capabilities.

The point spread function 252 may be used by a means for deconvolution 250 to deblur or improve the resolution of each of the two-dimensional image slices $232_{1-N}$, forming deblurred two-dimensional image slices $232'_{1-N}$. After deblurring, the deblurred two-dimensional image slices $232'_{1-N}$ may be combined by a means for combining 254 to form a three-dimensional image 256 of the target 212. The three-dimensional image 256 may be displayed, as for example on screen 258.

Because three-dimensional imaging may be affected by laser speckle, illumination that minimizes laser speckle and speckle-associated blurring may be desirable for determining the atmospheric point spread function. The use of an incoherent or quasi-coherent light source as the second light source 208 may facilitate the minimization of such laser speckle. For example, multiple lasers having the same or nearly the same output wavelengths may be used as the second light source 208 to illuminate the target 212. Multiple lasers may be synchronized to provide extra energy without damage threshold problems, e.g., thermal failure and dielectric breakdown of individual laser and/or parametric gain media. Techniques known in the art may be used to provide a common laser boresight for such multiple laser sources. In certain embodiments, a single, temporally- incoherent or quasi-coherent laser may be used as the second light source 208. In certain embodiment, the sun may be used as a source of incoherent light.

Figure 3:
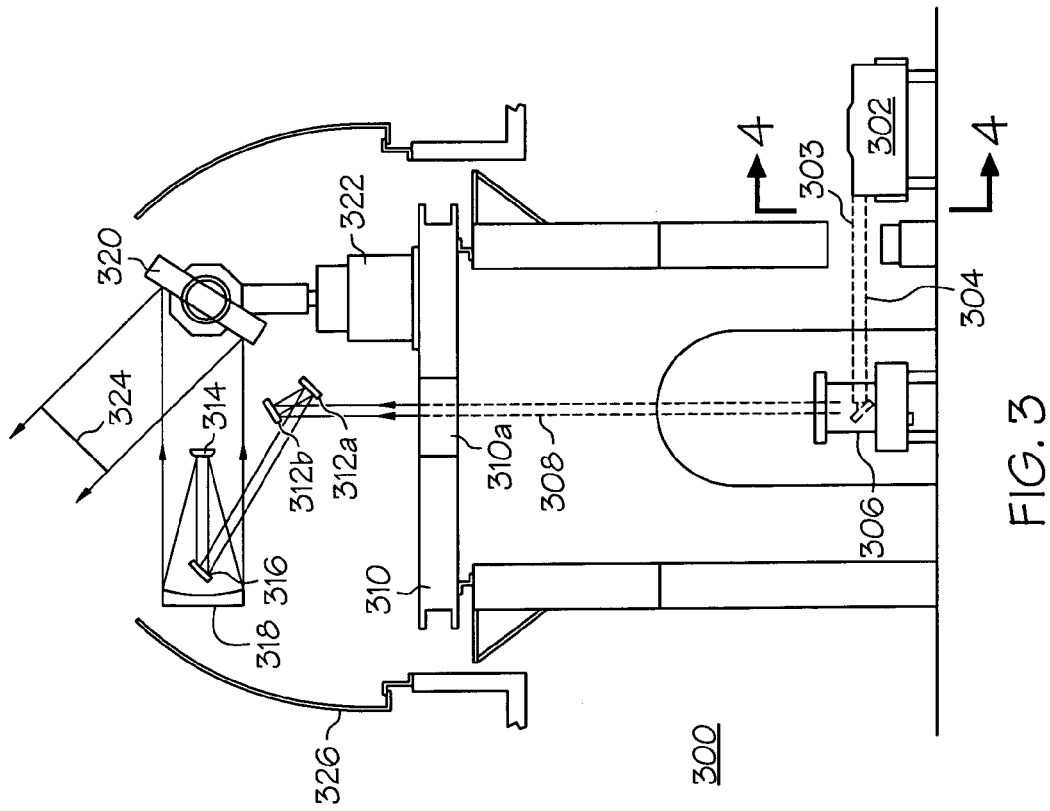
FIG. 3 is a diagram of functional components of an illustrative laser beam director.

Referring now to FIG. 3, functional components of one example of a means for directing are shown. The means for directing may include a laser beam director 300. The laser beam director may include one or more laser sources 302 with their outputs configured to form an afocal laser input or beam 303, for example with a 10-cm diameter, that may be directed into the laser beam director 300. The laser beam 303 may be directed along an azimuth table center normal 308 through an aperture 310a in an azimuth table 310. The azimuth table 310 may rotate and be positioned at a desired azimuth or heading.

One or more directing mirrors 312a, 312b may be utilized to direct the laser beam 303 within an outer shell 326 of the laser beam director 300. The laser beam 303 may be directed to various optical elements, e.g., primary 318, secondary 314, and tertiary 316 mirrors, that may act to expand the laser beam 303 to a desired diameter, e.g., 60 cm. A primary mirror 318 may direct the expanded laser beam 303 to a tracking mirror 320 such as a tracking flat. The tracking mirror 320 may pivot on a horizontal axis and also may be mounted on a gimbaled mirror mount 322.

The laser beam director 300 may include target tracker and boresight systems 306 that may operate to control the direction of an expanded laser beam output 324 of the laser beam director 300. By having the capability to pivot along two or more axes, the tracking mirror 320 may direct the expanded laser beam output 324 to a target, for example an artificial satellite, at any position in the observable sky. The output 324 may include an output of a first and/or second light source, e.g., outputs 204 and 210.

Figure 4:
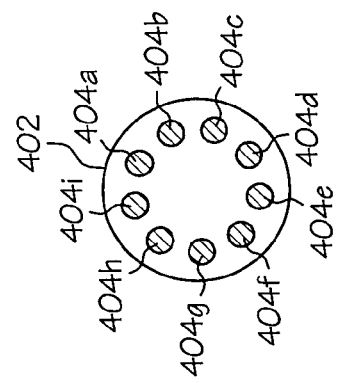
FIG. 4 is a cross section view of the laser beam director of FIG. 3 taken along line 4—4.

FIG. 4 shows a cross section view of the laser beam director of FIG. 3, taken along line 4—4. An afocal input 402 may be directed into the laser beam director 300 and may include more outputs from multiple lasers. For example, laser outputs 404a–404i may be combined and configured as shown to form a first output that may be directed to a target, e.g., target 112, by a means for directing such as laser beam director 300.

Figure 5:
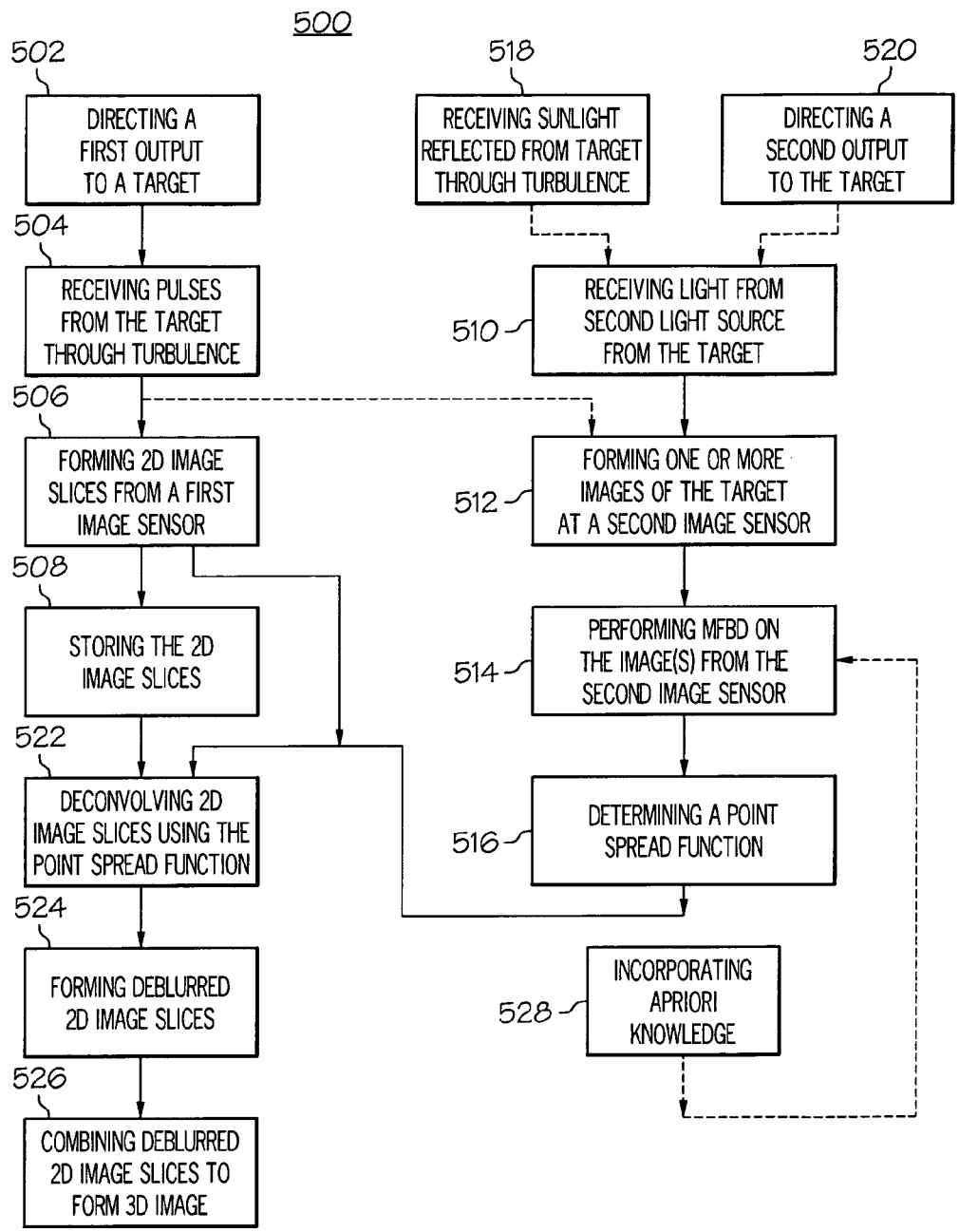
FIG. 5 is a flow chart of a method of producing a three-dimensional image of a target through atmospheric turbulence.

Referring now to FIG. 5, a method 500 of producing a three-dimensional image of a target through atmospheric turbulence will now be described. A first output of laser pulses may be directed 502 to a target. The pulses may be received from the target after traveling through atmospheric turbulence 504. Each pulse may be focused to form 506 a two-dimension (2D) image slice of the target. The two-dimensional image slices may optionally be stored 508 in memory, for example in bins in a first image sensor, such as first image sensor 130.

Light from a second light source may be received 510 from the target and an image of the target may be focused or formed 512 on a second image sensor. In certain embodiments, such as those where only a single light source is utilized, light from the first light source may be used to form an image at the second image sensor. Multiframe blind deconvolution (MFBD) may be performed 514 on one or more images received by the second image sensor. A point spread function may be estimated or determined 516 from the multiframe blind deconvolution. Step 510 may be performed at or near the time of step 502 so that the point spread function from the second light source may be valid for or describe nearly the same atmospheric conditions or realizations as the light transmitted from the first light source. A point spread function determined at 516 may be used for a sequence of two or more two-dimensional image slices from the first image sensor.

In certain embodiments, step 510 may include receiving sunlight 518 that has been reflected from the target and traveled through atmospheric turbulence. In certain embodiments, step 510 may include directing a second output 520 from a second light source, for example an incoherent or quasi-coherent laser, to the target. In certain embodiments, a second light source producing a second output having a coherence time less than certain pulse characteristics of the first output, e.g., pulse width, time between pulses or pulse repetition interval, etc., may be directed to the target.

Continuing with the description of method 500, the point spread function determined from the image(s) from the second image sensor may be used to deconvolve 522 the two-dimensional image slices of the first image sensor, forming 524 deblurred two-dimensional image slices. The deblurred two-dimensional image slices may be combined 526 to form a three-dimensional image of the target. The three-dimensional image produced by method 500 may have improved spatial resolution.

Method 500 may include additional steps of a calculating a maximum likelihood of a noise function and calculating gradients of a noiseless image may be calculated. Steepest gradient calculations may be made as part of the maximum likelihood calculation(s). The object, e.g., target, and point spread function may be parameterized. A priori knowledge may be incorporated 528 as part of the step of performing multiframe blind deconvolution 514. For example, positivity constraints may be implemented for the object and the point spread function. Also for example, penalty terms may be added to the likelihood function for the object. A priori knowledge may be incorporated in terms of an object pixel density function in which case the maximum likelihood formulation may be a maximum a posteriori (MAP) function or estimation. A regularizing technique such as use of a sieve or small smoothing kernel may be used to prevent the maximization procedure from overfitting. A guard band may be used to reconstruct an image of the target.

Figure 6:
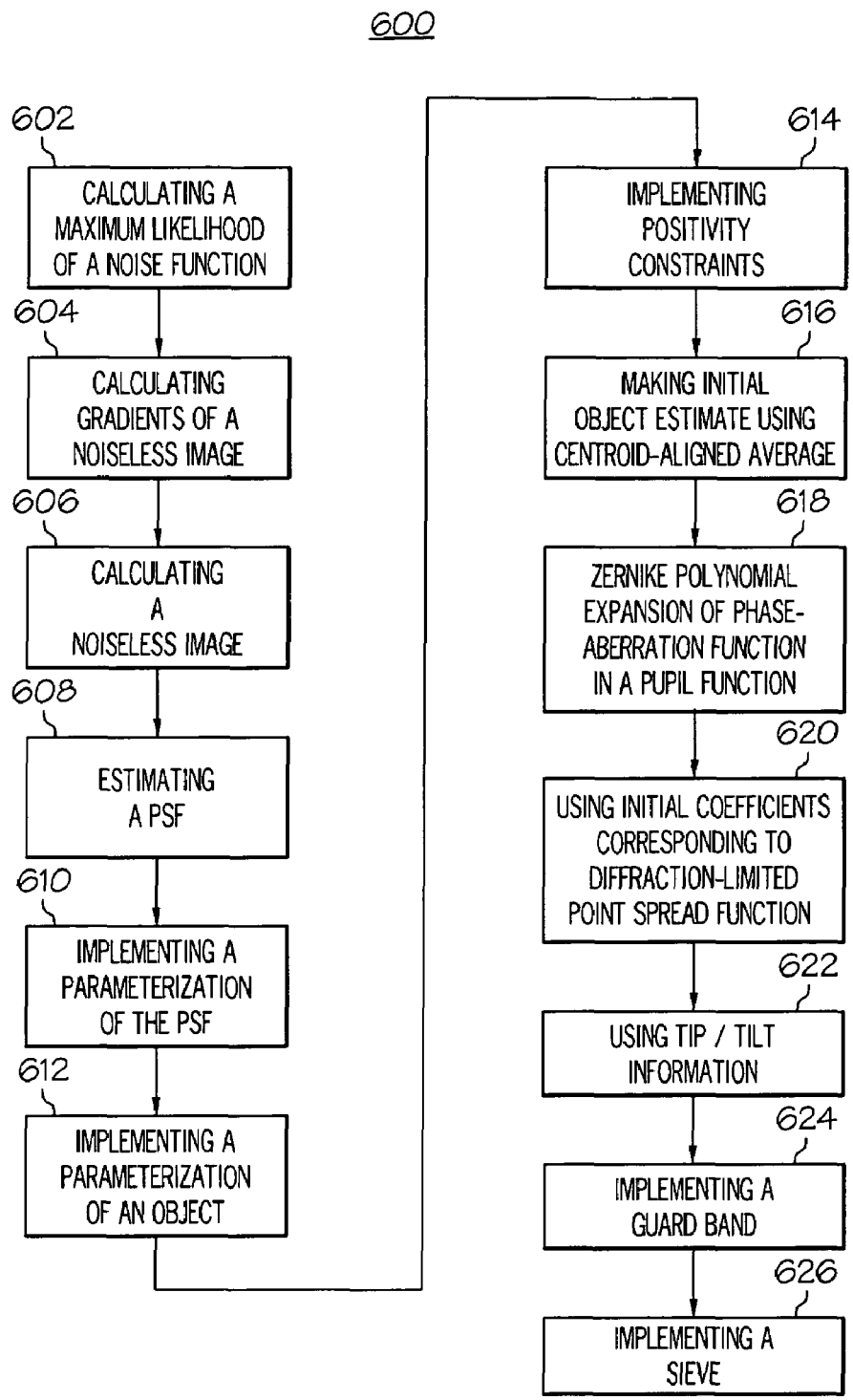
FIG. 6 is a conceptual diagram of functional blocks of a multiframe blind deconvolution algorithm for deblurring two-dimensional images.

In FIG. 6, function blocks of a multiframe blind deconvolution algorithm 600 for deblurring a two-dimensional image is shown. To process an image received at a second image sensor, a maximum likelihood of a noise function may be estimated or calculated 602 and gradients of a noiseless image may be calculated at functional block 604. A noiseless image may be determined 606 and a point spread function may be estimated 608.

Additional steps or functional blocks in the multiframe blind deconvolution algorithm 600 may include implementing a parameterization of the point spread function 610 and implementing a parameterization of an object 612. The steps of implementing a parameterization of the point spread function 610 and the object 612 may include implementing positivity constraints 614. An initial object estimate may be made 616 using a centroid-aligned average of data frames or image slices.

A basis function, e.g., a Zernike polynomial, expansion of a phase-aberration function in a pupil function may be made 618. Initial coefficients corresponding to a diffraction-limited point spread function may be used 620 and tip/tilt information from the image centroids may be used 622. In certain embodiments a guard band may be implemented 624. A regularizing sieve may be implemented 626 in certain embodiments. The sieve may be related to a signal-to-noise ratio of each set of image slices and may be a Gaussian sieve.

One of skill in the art would understand that the functions represented by the functional blocks in FIG. 6, are not limited to any specific hardware or software. For example, one of skill in the art should understand that the functions may be provided through the use of either shared or dedicated hardware, including, but not limited to, hardware including a computer-readable medium and/or capable of executing software. For example, a single shared digital signal processor or central processing unit may provide the function of blocks 612 and 614 of FIG. 6. Additionally, it should be understood that the functional blocks shown in FIG. 6 can be performed by a single computer or processor system or linked systems, e.g., processors operating in parallel.

Use of one embodiment of the present invention will now be described with reference to the accompanying drawings. A laser beam director or other suitable means may direct a first output of a first light source to a target. The position of the target may be known by observation or by the use of look-up tables. A receiving means collects a portion of the first output that has been reflected from the target and traveled through atmospheric turbulence. The portion of the light from the first light source is directed to a first image sensor, e.g., a fast focal plane or a time of arrival sensor. The first image sensor may detect a sequence of two-dimensional image slices of the target and may output a corresponding sequence of signals. The first image sensor may have a number, e.g., 32, of bins to store signals corresponding to the two-dimensional image slices.

Light from one or more light sources is received by the receiving means or a similar device. The light source(s) may include, but is/are not limited to, the sun, the first source, a second source, e.g., a laser, which may be a quasi-coherent or temporally incoherent laser, multiple lasers, and self-emission from the target. Light received at the receiving means or similar device may be directed to and focused on a second image sensor, forming an image or a succession of images of the target.

Signals related to one or more of the images from the second image sensor may be processed by a means for multiframe blind deconvolution and a point spread function for the atmospheric realizations under which the system operates may be estimated or determined. The means for multiframe blind deconvolution may iteratively calculate and revise the point spread function. Once the point spread function has been calculated, it may be used by a means for deconvolution to deblur the two-dimensional image slices produced by the first image sensor. The deblurred two-dimensional image slices may be combined to form a three-dimensional image of the target by a means for combining.

Accordingly, use of the present invention may provide improved ground-based or aircraft-based three-dimensional imaging of objects or targets through atmospheric turbulence. For example, objects in the Earth's atmosphere or in orbit about the Earth may be imaged with increased resolution in three spatial dimensions, including depth.

Because laser sources may be used that produce pulses that are on the scale of nanoseconds in duration, or less, and since light travels at approximately one foot per nanosecond in free space, resolution including depth resolution on the order of one foot or 30 cm may be obtained. The time between pulses may be adjusted or selected as desired based on various factors including, but not limited to, the pulse width and the size of a particular target. This resolution, or super-resolution, may be obtained with a ground-based telescope even though the seeing parameter for the telescope is less than the diffraction-limited case. A point spread function calculated from an incoherent or quasi-coherent light source may be used for the super-resolution.

Multiframe blind deconvolution may be performed on one or more images at the second image sensor to produce a point spread function, which can be used to deconvolve or deblur a set of two-dimensional image slices from the first image sensor, e.g., time of arrival sensor. The calculation of the point spread function may be iterated or recalculated for different two-dimensional image slices from the first image sensor. In this way, super-resolution of the two-dimensional image slices may be obtained and a high resolution three-dimensional image of the target or object may be produced. The calculation of the point spread function may be performed independently of the acquisition of data from the target by the first image sensor. Thus very short duration exposures of the target may be recorded by the first image sensor, e.g., time of arrival sensor or detector, thereby preserving diffraction-limited spatial frequency information about the target, and super-resolved using a speckle-minimized point spread function determined from the second image sensor.

A prospective example of a three-dimensional imaging system according to the present invention will now be described to illustrate the relationship between power and fluence levels of the laser outputs directed to a target and the detectivity of a first image sensor. For this example, a known artificial satellite, Object 18123 DMSP F8, is used, where "DMSP" is the acronym for the Defense Meteorological Satellite Program. The satellite has a 1.2 m body diameter and is 3.5 meters long and has a solar panel having an area of 9.3 $m^2$. The satellite is known to have an orbital altitude that varies from 832 to 851 Km, at an inclination of 98.8 degrees.

A first light source may be used that produces a first output or beam with pulses having fluence levels of one Joule per pulse. Directing the first output to the target, and setting the target distance to 1,000 Km (for simplification), 3.18 $mJ/m^2$ are directed to or incident on the target, assuming the first output diverges into 20 micro-radians at 1 Mm and the output beam has a flat top at the target. Assuming the target has a reflectivity of 10% and that the portion of the first output that is reflected by the target is reflected into a solid angle of $2\pi$ steradians, then 50.67 micro-Joules/$m^2$/steradian are reflected by the target for each pulse.

For a three-dimensional imaging system having a receiving means or collector telescope with a primary mirror with a diameter of 3.67 m, the primary mirror will collect $\pi/4$ (3.67/10⁶) steradians at the distance of the target, corresponding to $5.36 \times 10^{-16}$ J/m². For a 30 cm pixel on the satellite, i.e., an area on the satellite of 30 cm×30 cm, a 3.67 m telescope will collect $4.8 \times 10^{-17}$ J. If the first output produces light of wavelengths at 830 nm, which may be produced by a laser with a Cr:LiSAF gain medium, then there are approximately $4.19 \times 10^{18}$ photons/J. Consequently, each 30 cm pixel reflects approximately 200 photons into the pixel footprint.

Assuming 22% quantum efficiency for the detector materials in the first image sensor and a round trip transmission coefficient of 22%, then approximately 10 photoelectrons are produced or detected by the first image sensor for a 30 cm pixel footprint. So for each pulse directed to the Object 18123 DMSP F8 satellite, the first image sensor detector detects approximately 467 photoelectrons from the satellite body and 1033 photoelectrons from the solar panel.

Signals corresponding to photoelectrons may be stored in memory or bins associated with the first image sensor, and a point spread function may be derived through multiframe blind deconvolution of an image received by a second image sensor. The point spread function may be used to deconvolve or deblur the two dimensional image signals and deblurred two-dimensional image slices of the satellite may be combined to form a three-dimensional image of the satellite.

In certain embodiments, the means for multiframe blind deconvolution may include a suitable multiframe bind deconvolution (MFBD) algorithm that is implemented in MATLAB and/or C or C++. In certain embodiments, the deconvblind() function of MATLAB may be used as part of the means for multiframe blind deconvolution. Use of MATLAB may allow for cross-platform compatibility. In certain embodiment, the means for blind deconvolution may be a multiframe blind deconvolution algorithm utilizing a priori knowledge and/or maximum likelihood constraints. In certain embodiments, a multiframe blind deconvolution algorithm may implement maximum likelihood constraints may for a noise function, which may represent a Poisson noise case, a Gaussian noise case, or both.

Although the present invention has been described in detail with reference to certain versions thereof, other versions are possible. For example, while a single receiving means has generally been described, separate receiving means for each light source may be utilized within the scope of the present invention. Furthermore, while certain solid state laser or gain media have been described as being suitable as light sources, others may used, including gas and liquid dye gain media. Furthermore, more than one first and/or second image sensor may be used.

The reader's attention is directed to all papers and documents that are filed concurrently with this specification and which are open to public inspection with this specification, and the contents of all such papers and documents are incorporated herein by reference. All the features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalents or similar features.

What is claimed is:

1. A system for three-dimensional imaging comprising:
   a first light source producing a first output including two or more pulses;
   means for directing said first output to a target;
   receiving means operable to receive a portion of said first output reflected from said target through atmospheric turbulence;
   a first image sensor operable to produce two or more two-dimensional image slices of said target;
   a second image sensor operable to detect two or more second sensor images of said target;
   means for multiframe blind deconvolution operable to determine a point spread function from said two or more second sensor images;
   means for deconvolution operable to deconvolve said two or more two-dimensional image slices using said point spread function and to produce two or more deblurred two-dimensional image slices; and
   means for combining said deblurred two-dimensional image slices operable to form a three-dimensional image of said target.

2. The system of claim 1, further comprising light from a second light source reflected from said target, wherein said receiving means is operable to receive said light from said second sensor, and wherein said second image sensor is operable to detect said two or more second sensor images from said light from said second light source.

3. The system of claim 2, wherein said second light source is selected from the group consisting of a laser, the sun, multiple lasers, and self-emission form the target.

4. The system of claim 3, wherein said second light source is a quasi-coherent or temporally incoherent laser.

5. The system of claim 1, wherein said means for multiframe blind deconvolution comprise a computer readable medium having instructions thereon to perform a step of estimating a point spread function from a second sensor image.

6. The system of claim 1, wherein said means for deconvolution comprise a computer readable medium having instructions thereon to perform a step of deconvolving said point spread function from said two-dimensional image slices to produce deblurred two-dimensional image slices.

7. The system of claim 1, wherein said means for combining comprise a computer readable medium having instructions thereon to perform steps of combining said deblurred two-dimensional image slices and forming a three-dimensional image of said target.

8. The system of claim 1, wherein said means for directing comprise a laser beam director.

9. The system of claim 1, wherein said first light source comprises a laser having an active medium made of Cr:LiSAF or Nd:YAG.

10. The system of claim 1, wherein each of said two or more pulses has a fluence of about 0.1 to about 100 Joules per pulse.

11. The system of claim 1, wherein each of said two or more pulses has a pulse width of less than 5 nanoseconds.

12. The system of claim 11, wherein said pulse width is between about 0.1 to about 2 nanoseconds.

13. The system of claim 1, further comprising means for compression operable to receive, compress, and transmit said two or more pulses.

14. A method for creating a three-dimensional image of a target through atmospheric turbulence, comprising the steps of:
   directing a first output of pulses from a first laser to a target;
   receiving reflected pulses from said target through atmospheric turbulence;
   forming two or more two-dimensional image slices from a first image sensor;

forming one or more second sensor images of said target at a second image sensor;

performing multiframe blind deconvolution on said one or more second sensor images;

determining a point spread function from said one or more second sensor images;

deconvolving said two or more two-dimensional image slices using said point spread function;

forming a deblurred two-dimensional image slices from each of said two or more two dimensional image slices; and combining said deblurred two-dimensional image slices to form a three-dimensional image of said target.

15. The method of claim 14, further comprising storing said two or more two-dimensional image slices.

16. The method of claim 15, wherein said step of storing said two or more two-dimensional image slices comprises storing said two-dimensional image slices in a first image sensor.

17. The method of claim 14, further comprising receiving sunlight reflected from said target through said atmospheric turbulence.

18. The method of claim 14, further comprising directing a second output of pulses from a second laser to said target.

19. The method of claim 14, wherein said step of performing multiframe blind deconvolution further comprises incorporating a priori knowledge of a point spread function or of said target.

20. The method of claim 19, wherein said step of incorporating a priori knowledge comprises incorporating positivity constraints.

21. The method of claim 14, further comprising calculating a maximum likelihood of a noise function.

22. The method of claim 14, further comprising calculating one or more gradients of a noiseless image of said target.

23. The method of claim 14, further comprising calculating a noiseless image of said target.

24. The method of claim 19, wherein said step of incorporating a priori knowledge comprises incorporating an object pixel density function.

25. The method of claim 21, further comprising using a sieve or small smoothing kernel.

26. The method of claim 14, wherein said step of deconvolving said point spread function from each of said two-dimensional image slices further comprises using a guard band.

27. The system of claim 1, wherein said first image sensor is a time of arrival image sensor operable to produce said two-dimensional image slices.

28. The system of claim 1, wherein each of the first and second image sensors comprises a respective plane array of photodetectors, and further comprising a beam splitter operative to direct respective first and second portions of collected light output from the receiving means to the first and second image sensors.

29. The method of claim 14, wherein each of the first and second image sensors comprises a respective plane array of photodetectors by which the two-dimensional image slices and second sensor images are formed, and further comprising splitting collected light of the reflected pulses into respective first and second portions and directing the first and second portions to the first and second image sensors respectively.

30. A system for three-dimensional imaging, comprising:

a first light source operable to produce a first output including two or more pulses;

a director operable to direct said first output to a target;

a receiver operable to receive a portion of said first output reflected from said target through atmospheric turbulence;

a first image sensor operable to produce two or more two-dimensional image slices of said target;

a second image sensor operable to detect two or more second sensor images of said target; and a processing system operable:

a) to perform multiframe blind deconvolution to determine a point spread function from said two or more second sensor images;

b) to deconvolve said two or more two-dimensional image slices using said point spread function and to produce two or more deblurred two-dimensional image slices; and c) to combine said deblurred two-dimensional image slices operable to form a three-dimensional image of said target.

* * * * *